(12) United States Patent
Bissontz

(10) Patent No.: US 7,641,018 B2
(45) Date of Patent: Jan. 5, 2010

(54) CONTROL STRATEGY FOR DC EMERGENCY DIRECT CURRENT MOTOR FOR AN EMERGENCY HYDRAULIC PUMP

(75) Inventor: Jay E. Bissontz, Fort Wayne, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 331 days.

(21) Appl. No.: 11/837,798

(22) Filed: Aug. 13, 2007

(65) Prior Publication Data

US 2009/0044993 A1 Feb. 19, 2009

(51) Int. Cl.
*B60K 17/00* (2006.01)

(52) U.S. Cl. ............... 180/306; 180/65.21; 180/65.265; 180/65.27; 180/65.275; 180/65.31; 180/53.4; 180/53.5; 180/53.8

(58) Field of Classification Search ............... 180/65.21, 180/65.265, 65.27, 65.275, 65.31, 53.4, 53.5, 180/53.8
See application file for complete search history.

(56) References Cited

U.S. PATENT DOCUMENTS

| | | | | |
|---|---|---|---|---|
| 2,968,915 | A * | 1/1961 | Feistel, Jr. | 60/435 |
| 6,272,402 | B1 | 8/2001 | Kelwaski | |
| 6,360,834 | B1 * | 3/2002 | Gauthier | 180/65.23 |
| 6,922,990 | B2 * | 8/2005 | Naruse et al. | 60/414 |
| 2006/0052215 | A1 | 3/2006 | Beaty et al. | |

* cited by examiner

*Primary Examiner*—Paul N Dickson
*Assistant Examiner*—Bryan A Evans
(74) *Attorney, Agent, or Firm*—Jeffrey P. Calfa; Mark C. Bach

(57) ABSTRACT

A control system for a hybrid-vehicle equipped with power takeoff equipment provides control over primary and redundant, relatively low output systems so that the redundant system is not damaged by concurrent operation of the primary system.

8 Claims, 3 Drawing Sheets

# CONTROL STRATEGY FOR DC EMERGENCY DIRECT CURRENT MOTOR FOR AN EMERGENCY HYDRAULIC PUMP

BACKGROUND OF THE INVENTION

1. Technical Field

The invention relates to control of power takeoff operation equipment installed on a hybrid-vehicle and more particularly to back up, twelve-volt, direct current supported power takeoff operation of the equipment.

2. Description of the Problem

The use of a hybrid-vehicle chassis to support power takeoff operation (PTO) of equipment such as an aerial lift unit (colloquially called a "cherry picker"), a compactor on a garbage truck, a liquid fuel delivery pump on a tanker truck and the like, is relatively new, even in the context of the development of hybrid-vehicles. Integration of the control of PTO equipment on the hybrid-vehicle poses specific challenges.

It is favored practice to use hybrid-vehicle electric traction motors to support PTO as opposed to using the vehicle's internal combustion (IC) engine. A reason for this is that the vehicle's IC engine, typically a diesel capable of moving the vehicle at highway speeds, is designed to provide far more power than is required by the PTO equipment and accordingly is not operated in an optimal manner when the vehicle is supporting PTO operation. The problem is magnified in the environment of an aerial tower vehicle where the vehicle is not moving during PTO operation and PTO operation may only be occasional as and when demanded by an operator. If the IC engine is kept running to be ready for PTO, much fuel is wasted with the engine idling while waiting for operator inputs and in parasitic losses at the low power output levels. Electric motors by contrast suffer far less from parasitic losses than do thermal engines and demand relatively little power input in excess of their output. Moreover, electric motors are not run at idle. Use of the primary traction motor to power a high-pressure high-volume hydraulic pump allows greater efficiency over use of an idling diesel engine to power a PTO hydraulic pump.

For some types of PTO, particularly aerial lift units, it is necessary to provide a backup prime mover. In an aerial lift unit a small output direct current electric motor driving an auxiliary hydraulic pump is advantageously used. The DC electric motor can run off the twelve volt direct current source such vehicles are conventionally equipped with instead of the much higher voltage traction system. Thus the back up motor is supplied with electricity from a different source than the traction motor uses to energize the primary pump. An automotive starter motor may be used as the backup motor, such motors being relatively inexpensive.

However, the potential for conflict exists between the PTO hydraulic pump driven by the traction motor and the emergency hydraulic pump powered by the twelve volt DC motor. Such conflict may result in damage to the emergency hydraulic pump or its DC motor, which have a much lower maximum power output than do the primary PTO pump and motor.

Many contemporary vehicles are now equipped with body computers, local controllers and controller area networks to implement most aspects of vehicle control. In vehicles designed, built and sold by International Truck and Engine Corporation, an Electrical System Controller ("ESC") carries out the functions of the body computer. Local controllers which communicate with each other and with the ESC to distribute data and requests essential for operation of local programming by which control is implemented. Controller area networks have been applied both to conventional vehicles and to hybrid-vehicles. Control strategies relating both to the primary and backup motors are preferably implemented on the ESC, which will control the operation of both motors.

SUMMARY OF THE INVENTION

According to the invention there is provided a hybrid diesel-electric vehicle equipped with power takeoff operation accessories. The hybrid diesel-electric vehicle includes a conventional public data bus with its body computer, and at least a first secondary data bus. One secondary data bus interlinks a transmission controller with a hybrid system controller and transmission gear selection controller and provides a gateway to the public data bus. Another secondary controller links a generic programmable module used for PTO accessory control with the body computer, which in turn provides a gateway to the public data bus. Still another secondary data bus is connected between a switch pack and the body computer, which again provides a gateway to the public data bus. Control is provided for two alternative hydraulic pump systems which are energized from different sources, which have differing output capacities and where one pump system serves as an auxiliary or supplement to the other under certain circumstances.

At issue in the present application is implementing a control strategy which avoids damage to an auxiliary direct current electric motor and auxiliary hydraulic pump by conflicting operation of the primary system. The auxiliary motor/pump combination provide alternative, generally reduced, energization to an aerial lift unit system (or other PTO system) from the vehicle's 12 volt electrical system. The primary PTO hydraulic pump is run from a traction motor which is energized from a much higher voltage source and which has a capacity for much higher maximum power output.

Control arrangements are finalized by programming, which may be specific to a particular vehicle and alterable with time, the vehicle gains flexibility and system robustness is enhanced.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
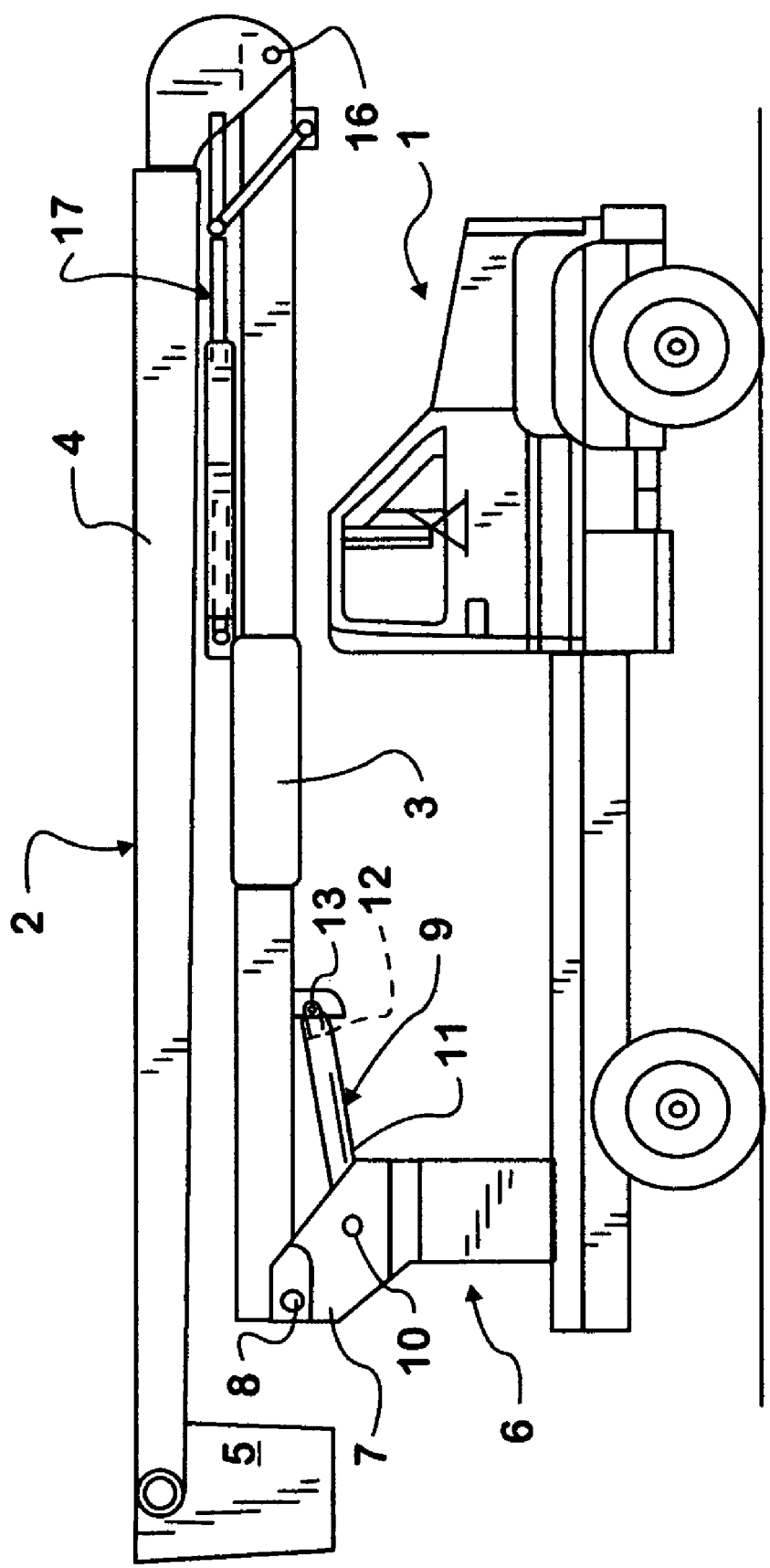
FIG. 1 is a simplified illustration of a truck mounted aerial lift assembly for locating an operator in various raised positions.

Referring now to the figures and in particular to FIG. 1, an example of a diesel-electric hybrid mobile aerial lift truck 1 is illustrated. The mobile aerial lift truck 1 includes an aerial lift unit 2 mounted to a bed on the back portion of the truck. The aerial lift unit 2 includes a lower boom 3 and an upper boom 4 pivotally interconnected to each other. The lower boom 3 is in turn mounted to rotate on the truck bed on a support 6 and rotatable support bracket 7. The rotatable support bracket 7 includes a pivoting mount 8 for one end of lower boom 3. A bucket 5 is secured to the free end of upper boom 4 and supports personnel during lifting of the bucket to and support of the bucket within a work area. Bucket 5 is pivotally attached to the free end of boom 4 to maintain a horizontal orientation at all times. A lifting unit 9 is interconnected between bracket 7 and the lower boom 3. A pivot connection 10 connects the lower boom cylinder 11 of unit 9 to the bracket 7. A cylinder rod 12 extends from the cylinder 11 and is pivotally connected to the boom 3 through a pivot 13. Lower boom cylinder unit 9 is connected to a pressurized supply of a suitable hydraulic fluid, which allows the assembly to be lifted and lowered.

The outer end of the lower boom 3 is interconnected to the lower and pivot end of the upper boom 4. A pivot 16 interconnects the outer end of the lower boom 3 to the pivot end of the upper boom 4. An upper boom compensating cylinder unit or assembly 17 is connected between the lower boom 3 and the upper boom 4 for moving the upper boom about pivot 16 to position the upper boom relative to the lower boom 3. The upper boom compensating cylinder 17 permits independent movement of the upper boom 4 relative to lower boom 3 and provides compensating motion between the booms to raise the upper boom with the lower boom. Unit 17 is supplied with pressurized hydraulic fluid from the same sources as unit 9.

A vehicle such as diesel-electric hybrid vehicle 1 is an example of a vehicle having a power takeoff operation (PTO) application with which the present invention is advantageously employed, that is, where there is a need for both a primary and a backup/auxiliary hydraulic PTO system. As discussed below, the primary source of pressurized hydraulic fluid is preferably an automatic transmission driven by an electric traction motor. In the case of International vehicles using a hybrid drive system supplied by the Eaton Corporation, the transmission is an automated manual transmission. The invention is applicable to manual transmission equipped vehicles. An auxiliary source of pressurized hydraulic fluid could be a power steering type pump driven by a 12 volt starter motor. Such a pump would usually serve as a backup to use of the automatic transmission as a PTO pump, but may, in some applications operate to supplement operation of the automatic transmission.

Figure 2:
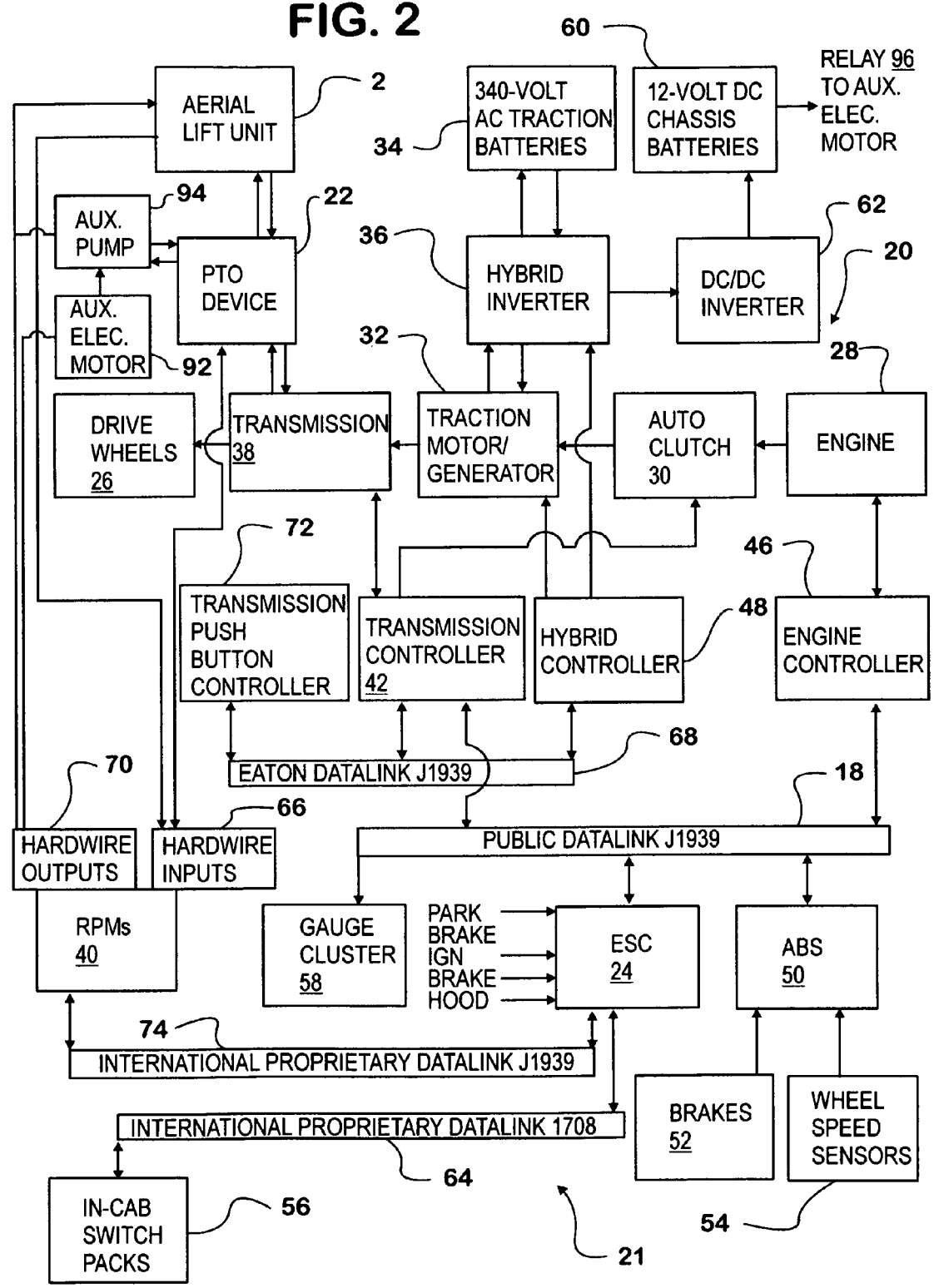
FIG. 2 is a high level schematic of a vehicle control system for a hybrid-vehicle equipped with a PTO application.

Referring to FIG. 2, a high level schematic of a control system 21 which provides for vehicle 1 control is illustrated. An electrical system controller 24, a type of a body computer, is linked by a public datalink 18 to a variety of local controllers which in turn implement direct control over most vehicle 1 functions. Electrical system controller (ESC) 24 may also be directly connected to selected inputs and outputs. As illustrated, an ignition switch input, a brake pedal position input and a park brake position sensor are connected to supply signals to the ESC 24. In some embodiments, a fuel level sensor input and a throttle position input may also supply signals to the ESC 24. Signals for PTO operational control from within a cab may be implemented using switch pack(s) 56. It is customary where with aerial lift unit systems, where intended for work on electrical lines, that the bucket is provided with pneumatic links to electrical switches installed on the vehicle proper. In-cab switch pack 56 is connected to ESC 24 over a proprietary data link 64 conforming to the SAE J1708 standard. Data link 64 is a low baud rate data connection, typically on the order of 9.7 Kbaud. Four major local controllers in addition to the ESC 24 are illustrated connected to the public datalink 18. These controllers are the engine controller 46, the transmission controller 42, a gauge controller 58 and an anti-lock brake system controller (ABS) 50. Datalink 18 is preferably the bus for a public controller area network (CAN) conforming to the SAE J1939 standard and under current practice supports data transmission at up to 250 Kbaud. It will be understood that other controllers may be installed on the vehicle 1 in communication with datalink 18. ABS controller 50, as is conventional, controls application of brakes 52 and receives wheel speed sensor signals from sensors 54. Wheel speed is reported over datalink 18 and is monitored by transmission controller 42. The presence of an ABS controller 50 is not meant to imply that it is the primary braking means. Normal braking is provided by operation of traction motor/generator 32 in its generation mode for recapture and storage of vehicle kinetic energy in batteries.

Vehicle 1 is preferably a hybrid diesel-electric vehicle which utilizes a drive train 20 in which the traction motor/generator 32 is connected in line with an engine 28. As with other hybrid designs, the system is intended to recapture the vehicle's inertial momentum during braking to later supplement engine output. Drive train 20 is a particular variation of hybrid design which affords advantages in a utility vehicle application. Engine 28 can, in some applications, support PTO operation directly and/or can drive traction motor/generator 32 to generate electrical power for storage. It is often preferable to operate engine 28 is run at its optimal power output level to generate electricity for storage and then to tap the electrical power storage facility for power to support of PTO operation. This is true particularly where the PTO application demands intermittent operation and requires substantially less power than the IC unit generates in its most efficient operating range. Traction motor/generator 32 is also used to recapture vehicle kinetic energy during deceleration by using the drive wheels 26 to drive the traction motor/generator 32. Engine 28 may be utilized to supply power to generate electricity, to both generate electricity and operate PTO system 22, to provide motive power to drive wheels 26, or to provide motive power and to run a generator to generate electricity. Where the PTO system 22 is an aerial lift unit 2 it is unlikely that the aerial lift unit would be operated when the vehicle was in motion, and the description here assumes that in fact that the vehicle will be required to be stopped. However, other PTO applications may exist where motion would be permitted. Since aerial lift unit 2 operation tends to be intermittent and to require fine positioning control it is also less likely that the engine 28 would be used for direct support of PTO operation. However, with sufficient engine capacity, it is conceivable that electrical power generation, motive power generation and PTO operation could be concurrent. Such an arrangement might advantageously be used on a garbage truck with a trash compactor PTO application.

Drive train 20 provides for the recapture of kinetic energy in response to the traction motor/generator 32 being back driven by the vehicle's kinetic force. Transitions between positive and negative traction motor contribution are detected and managed by a hybrid controller 48. Traction motor/generator 32, during braking, generates electricity which is applied to a storage battery 34 through inverter 36. Hybrid controller 48 looks at the ABS controller 50 datalink traffic to determine if regenerative kinetic braking would increase or enhance a wheel slippage condition if regenerative braking were initiated. Transmission controller 42 detects such traffic on datalink 18 and translates this as control signals for application to hybrid controller 48 over datalink 68. Traction motor/generator 32, during braking, generates electricity which is applied to a Lithium-ion storage battery 34 through hybrid inverter 36. Some electrical power may be diverted from hybrid inverter to maintain the charge of a conventional 12-volt DC Chassis battery 60 through a DC/DC inverter 62. The 12-volt DC battery 60 is used to support operation of the auxiliary DC electric motor 92.

Traction battery 34 is a lithium-ion battery and is preferably the only electrical power storage system for vehicle 1. Lithium ion batteries are used in 42 volt DC power systems. In vehicles contemporary to the writing of this application numerous 12 volt applications remain in common use and vehicle 1 is equipped with a 12 volt system to support these systems. The parallel system is not shown is full detail for the sake of simplicity of illustration and since such systems have been in common use in automotive applications for decades. The twelve volt vehicle power system supplies power to an auxiliary motor 92 for the PTO back up system and is based on an engine driven alternator and 12 volt, 6 cell lead acid batteries. The use of this parallel electrical system allows the use of readily available and inexpensive starter motors to serve as the auxiliary electric motor 92.

Traction motor/generator 32 may be used to propel vehicle 1 by drawing power from battery 34 through inverter 36, which supplies 3 phase 340 volt rms power. Battery 34 is sometimes referred to as the traction battery to distinguish it from a secondary 12 volt lead acid battery 60. High mass vehicles tend to exhibit far poorer gains from hybrid locomotion than do automobiles vehicles but hybrid technology can be highly advantageous when applied to PTO applications. Thus the preferred use of stored electrical power is to power PTO system 22. In addition, traction motor/generator 32 is used for starting engine 28 when the ignition is in the start position. Under some circumstances engine 28 is used to drive the traction motor/generator 32 with the transmission 38 in a neutral state to generate electricity for recharging battery 34 and/or engaged to the PTO system 22 to generate electricity for recharging the battery 34 and operate the PTO system 22. This would occur in response to heavy PTO system 22 use which draws down the charge on battery 34. Typically engine 28 has a far greater output capacity than is required for operating PTO system 22. As a result using it to directly run PTO system 22 full time would be highly inefficient due to parasitic losses incurred in the engine. Greater efficiency is obtained by running engine 28 at close to its rated output to recharge battery 34 and then shutting down the engine and using battery 34 to supply electricity to traction motor/generator 32 to operate PTO system 22. An aerial lift unit 2 is often used only sporadically by a worker for reposition of basket 5 and wasteful idling of engine 28 is thus avoided. Engine 28 runs periodically at an efficient speed to recharge the battery only if required by the battery 34 state of charge. Battery 34 state of charge is determined by the hybrid controller 48, which passes this information to transmission controller 42 over datalink 68. Transmission controller 42 can in turn request ESC 24 to engage engine 28 by a message to the ESC 24, which in turn sends power request signals, (and start and stop signals) to engine controller 46. The availability of engine 28 may depend on certain programmed (or hardwired) interlocks, such as hood position. It is presumed that data relating to such conditions are available to ESC 24.

Drive train 20 comprises an engine 28 connected in line with an auto clutch 30 which allows disconnection of the engine 28 from the rest of the drive train when the engine is not required for motive power or for recharging battery 34. Auto clutch is directly coupled to the traction motor/generator 32 which is in turn connected to a transmission 38. Transmission 38 is in turn used to apply power from the traction motor/generator 32 to the PTO system 22 or to drive wheels 26. Transmission 38 is bi-directional and can be used to transmit energy from the drive wheels 26 back to the traction motor/generator 32. Traction motor/generator 32 may be used to provide motive energy (either alone or in cooperation with the engine 28) to transmission 38. When used as a generator the traction motor/generator supplies electricity to inverter 36 which supplies direct current for recharging battery 34.

A control system 21 implements cooperation of the control elements to implement the operations just described. ESC 24 receives inputs relating to throttle position, brake pedal position, ignition state and PTO inputs from a user and passes these to the transmission controller 42 which in turn passes them to the hybrid controller 48. Hybrid controller 48 determines, based on available battery charge state, requests for power. Hybrid controller 48 with ESC 24 generates the appropriate signals for application to datalink 18 for instructing the engine controller 46 to turn engine 28 on and off and, if on, at what power output to operate the engine. Transmission controller 42 controls engagement of auto clutch 30. Transmission controller 42 further controls the state of transmission 38 in response to transmission push button controller 72, determining the gear the transmission is in or if the transmission is to deliver drive torque to the drive wheels 26 or to deliver pressurized hydraulic fluid to the hydraulic manifolds and valves which are part of PTO system 22 and which position the aerial lift unit 2. The arrangement shown is characteristic of an automatic transmission equipped vehicle and an alternative arrangement, providing a hydraulic pump intermediate the transmission and PTO device 22, would be required for a vehicle equipped with a manual transmission. PTO device 22 provides full rotational motion as well as lifting and lowering of aerial lift unit 2.

PTO control is implemented through one or more remote power modules (RPMs). Remote power modules are datalinked expansion input/output modules dedicated to the ESC, which is programmed to utilize them. RPMs 40 function as the local PTO controller, and provide hardwire outputs 70 and hardwire inputs 66 required by the PTO device 22 to and from the aerial lift unit 2. Requests for movement from the aerial lift unit 2 and position reports are applied to the proprietary datalink 74 for transmission to the ESC 24, which translates them into specific requests for the other controllers, e.g. a request for PTO power. ESC 24 is also programmed to control valve states through RPMs 40 in PTO device 22. Remote power modules are more fully described in U.S. Pat. No. 6,272,402 which is assigned to the assignee of the present invention and is fully incorporated herein by reference. At the time the '402 patent was written what are now termed "Remote Power Modules" were called "Remote Interface Modules". RPMs may be treated as slaves of ESC 24.

Auxiliary operation of aerial lift unit 2 through PTO device 22 is done by provision of an auxiliary DC electric motor 92 and an auxiliary hydraulic pump 94, which is connected into a manifold in PTO device 22. Auxiliary electric motor 92 is powered from the twelve volt battery 60 under the control of RPM 40, which operates to turn close and open a relay 96 between battery 60 and motor 92 in response to control commands.

Transmission controller and ESC 24 both operate as portals and/or translation devices between the various datalinks. Proprietary datalinks 68 and 74 operate at substantially higher baud rates than does the public datalink 18, and accordingly, buffering is provided for a message passed from one link to another. Additionally, a message may have to be reformatted, or a message on one link may require another type of message on the second link, e.g. a movement request over datalink 74 may translate to a request for transmission engagement from ESC 24 to transmission controller 42. Datalinks 18, 68 and 74 are all controller area networks and conform to the SAE J1939 protocol. Datalink 64 conforms to the SAE J1708 protocol.

The invention uses the vehicle ESC 24 to coordinate operation of the traction motor 32 powered hydraulic pump/transmission 38 and the auxiliary motor 92 powered auxiliary hydraulic pump 94 to avoid overpowering and damaging the auxiliary pump 94. Valve arrangements within PTO device 22, under the control of RPM 40, allow selective interruption of the hydraulic circuit within the PTO device from the transmission 38. Such coordinated operation can be implemented to mitigate the effects of a primary pump/transmission 38 that has experienced at least a partial failure. Specifically, in such a circumstance the emergency DC hydraulic pump 94 could be made to supplement the hydraulic output of a failing traction-motor powered primary hydraulic pump 38. The particular control strategy selected is programmed directly into the vehicle ESC 24. Depending upon a customer's specifications, programming could implement smooth transition from one pump system to another to allow the system to compensate for such things as hydraulic transients during the transition. However, the possibility rather than the detail of a particular control strategy are the focus of the present invention. Other variables that may be considered during the management of the system may include the amount of time the emergency DC hydraulic pump is allowed to run at a certain pressure and displacement, the state of charge of both the primary traction batteries and the 12 volt vehicle batteries, ambient temperature, aerial tower position, and others. Because the backup motor 92 runs at only a single speed, unlike the traction motor 32 which runs at variable speeds, control over aerial lift unit 2 positioning is more limited than with the traction motor. Moreover, the volume of fluid moved is substantially less, so the auxiliary system can move the aerial lift unit 2 at only a fraction of the speed that is obtainable using traction motor 32 powered pump.

Figure 3:
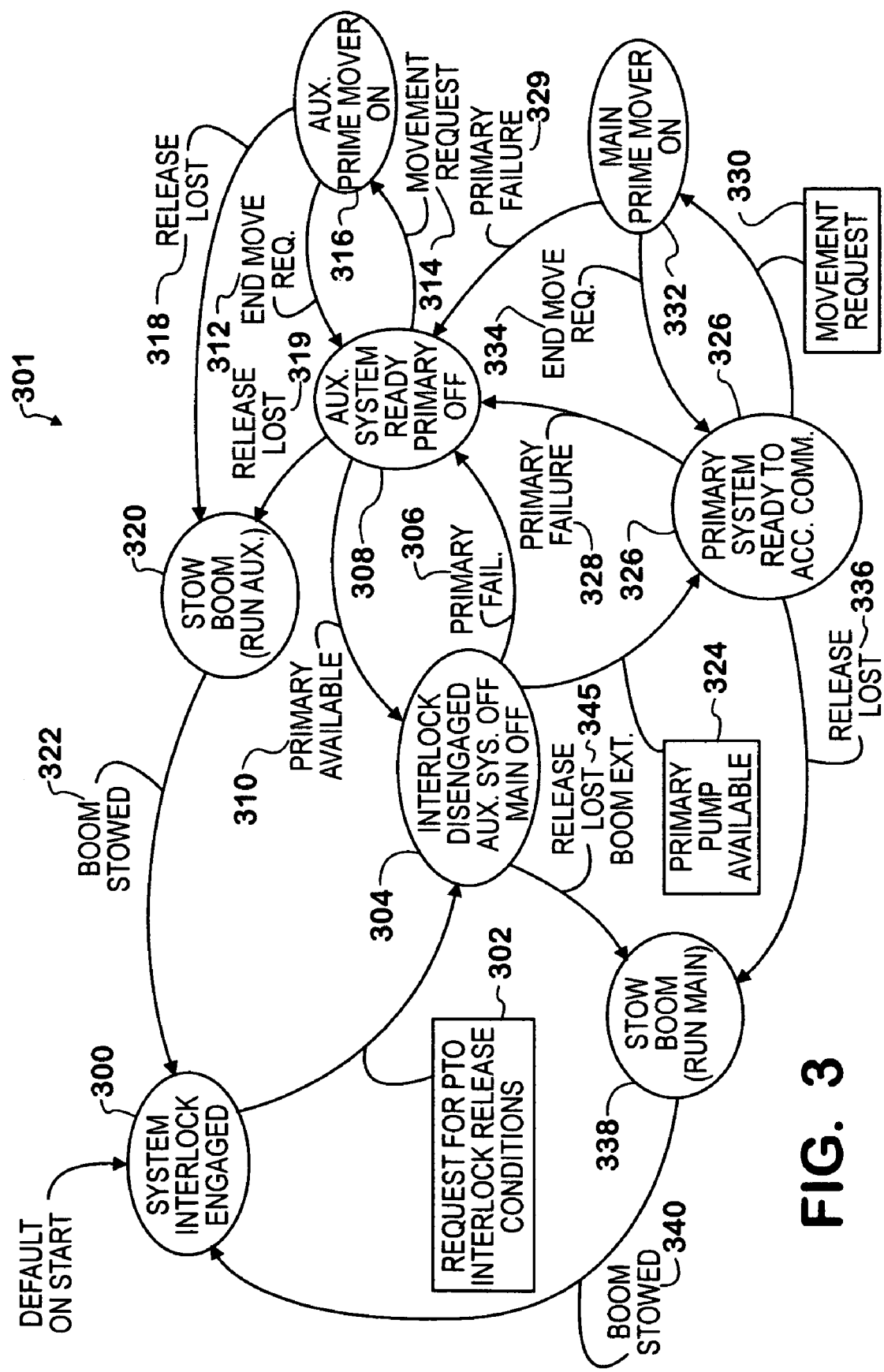
FIG. 3 is a highly simplified state diagram illustrating a possible control scenario for an aerial lift unit installed on a hybrid vehicle.

FIG. 3 is a state diagram for a representative, although highly simplified, control system for an aerial lift unit 2 mounted on a hybrid, diesel-electric utility vehicle 1 where operation of the lift unit is supported by PTO. It is anticipated that each customer will customize the particular control arrangements for its vehicles and thus the state machine 301 depicted is to be taken as an example only and in no way limiting of possible control arrangements which may be adopted. The example is directed to an aerial lift unit, but the system could be applied to trash compacting arrangements on a hybrid garbage truck, among other possibilities.

The default state of state machine 301 on turning the vehicle on is a PTO system interlock engaged state 300. In the system interlock engaged state the aerial lift unit 2 or boom is stowed and locked for vehicle travel. Upon a request for PTO and under conditions where the conditions 302 for release of the interlock on the aerial lift unit have been satisfied state machine 301 assumes an interlock dis-engaged state 304. From interlock disengaged state 304 operation of the aerial lift unit 2 is allowed upon receipt of a request for movement. Conditions 302 for release of the interlock are not exhaustively listed here, but may include deployment of outriggers, level status of the vehicle, transmission position, traction battery state of charge, etc. Tests for primary and auxiliary system readiness may be included as part of the programming.

State machine 301 may assume a number of different states from the interlock disengaged state 304. As illustrated here, a design philosophy has been adopted that avoids concurrent operation of the traction motor and the auxiliary motor. Accordingly, it is first determined if there are faults with the primary or auxiliary systems. Obviously if neither is available, and the aerial lift has not been moved, a fault 342 has occurred and the state machine 301 returns to the default interlock engaged state 300. If the aerial lift unit has not been moved, the failure of either the primary or auxiliary system independently may be taken as a fault. In other words, a design philosophy may be used that requires a backup be available before the system is initially used. As laid out here, state machine 301 does not treat with the possibility of a double failure occurring if both primary and auxiliary systems are available initially. In some applications a higher level of fail safe operation may be considered desirable, though those skilled in the art will realize that such would be obtainable only at greater expense. Under normal operation the condition 324 that the primary system is available obtains and machine 301 moves to the primary system on and ready to accept movement requests condition 326. From the primary ready state 326 a movement request condition 330 results in activation of the primary system prime mover 332, i.e. the vehicle electric traction motor. With completion of the movement and end of movement request condition 334 exists and the state transitions back to the primary-system ready state 326.

It is possible that a primary system failure condition 328/329 can occur after either the primary system ready state 326 or primary system activated condition 332 has been assumed by the machine. In either case machine 301 assumes the auxiliary system ready state 308. The auxiliary system ready state 308 can also be reached directly from the interlock disengaged state if the primary system condition 306 is that it is unavailable. This may be termed a primary system failure 306, however, the system may be temporarily unavailable due to other conditions, such as a run down state of the traction battery. If the traction battery is in a discharged state the vehicle's IC engine is likely on the traction motor is running in its power generating mode. Depending upon customer specifications the hydraulic pump may or may not be engaged to the IC engine at this time. The IC engine will presumably be run at an efficient power output level for recharging the battery and it may or may not be desirable to run the vehicle hydraulics at these output levels. Thus a return condition 310 is provided from the auxiliary system ready state 308 to the interlock disengaged state 304. The auxiliary system ready state 308 provides that the primary system is OFF, that is unavailable to accept commands.

From the auxiliary system ready state 308 a movement request condition 314 is responded to activating the auxiliary system prime mover, reflected by movement of machine 301 to the auxiliary prime mover ON state 316. When an end of movement request condition 312 obtains, the state returns to the auxiliary system ready state 308. Thus, in this embodiment, the primary system can never become active when the auxiliary primary system is on, to protect the auxiliary system. Once the auxiliary system has been engaged the primary system can only be reached again through the interlock disengaged state 304 or the system interlock engaged state 300 thereby assuring that the auxiliary system is off.

In this exemplary embodiment the aerial lift unit/boom is returned to a stowed position and the interlocks engaged upon loss of all (or selected) interlock release conditions, such as an attempt to move the vehicle, or upon operator cancellation of PTO operation. All of these events are treated as release lost condition 318, 319, 336, 345 and 347 from the auxiliary prime mover ON state 316, the auxiliary system ready state 308, the primary system ready state 326, the main prime mover ON state 332 and the interlock disengaged state 304. Conditions 318, 319 result in the machine 301 moving to the stow boom state 320 with the auxiliary prime mover being utilized to provide hydraulic pressure and appropriate commands being issued to steer and move the aerial lift unit into its travel position for lock down. It will be understood that sensors are installed on the vehicle to provide aerial lift position to the ESC 24 which directs RPM 40 to open the appropriate valves in PTO device 22 to effect repositioning of the boom/aerial lift. Transition conditions 336, 345 and 347 result in stow boom state 338 occurring in which the main system operates to reposition the aerial lift. Once the aerial lift unit is stowed (conditions 322, 340) the system interlocks are engaged and the aerial lift is locked down.

The invention provides an effective regime for management of pump systems of differing output capacities where one pump system serves as a backup to the other.

While the invention is shown in only one of its forms, it is not thus limited but is susceptible to various changes and modifications without departing from the spirit and scope of the invention.

What is claimed is:

1. A hybrid vehicle comprising:
   a power takeoff operation application;
   a traction motor/generator;
   a primary pump for supplying pressurized fluid to the power takeoff operation application, the traction motor/generator being connectable to the primary pump for operating the primary pump;
   an auxiliary pump for supplying pressurized fluid to the power takeoff operation application;
   an auxiliary motor connected to the auxiliary pump for operating the auxiliary pump;
   a first electrical power source for supplying electrical power to the traction motor/generator;
   a second electrical power source for supplying electrical power to the auxiliary motor; and
   a programmable control system for coordinating energization of the traction motor/generator and auxiliary motor in response to an operator request for operation of the power takeoff operation application.

2. A hybrid vehicle in accordance with claim 1, further comprising:
   the programmable control system being responsive to at least a first programmed condition for automatically transferring energization from the traction motor/generator and to the auxiliary motor under an operator request for operation of the power takeoff operation application.

3. A hybrid vehicle in accordance with claim 2, further comprising:
   the programmable control system being programmed to prevent concurrent operation of the traction/motor generator for power takeoff operation and the auxiliary motor.

4. A hybrid vehicle in accordance with claim 2, further comprising:
   the second electrical power source including a twelve volt automotive battery.

5. Apparatus comprising:
   a primary motor;
   a primary pump for coupling to the primary motor for pressurizing a working fluid at pressure;
   an auxiliary motor;
   an auxiliary pump coupled to the auxiliary motor for delivering the working fluid at pressure;
   a machine connected to the primary pump and the auxiliary pump for utilizing pressurized working fluid from the primary pump or the auxiliary pump; and
   a control system for selecting a source of pressurized fluid for the machine from among the primary pump and the auxiliary pump, the controller providing control over operation of the auxiliary motor in response to the selection.

6. Apparatus in accordance with claim 5, further comprising:
   the control system being programmable to allow operator selection of conditions determining selection of the primary pump and the auxiliary pump for providing the pressurized working fluid.

7. Apparatus in accordance with claim 6, further comprising:
   the control system providing for disengagement of the primary pump from the primary motor in response to selection of the auxiliary pump to provide pressurized fluid.

8. Apparatus in accordance with claim 6, where installed on a motor vehicle.

* * * * *